(12) United States Patent
Wagh et al.

(10) Patent No.: US 7,294,291 B2
(45) Date of Patent: Nov. 13, 2007

(54) CERAMICRETE STABILIZATION OF U-AND PU-BEARING MATERIALS

(75) Inventors: Arun S. Wagh, Naperville, IL (US); M. David Maloney, Evergreen, CO (US); Gary H. Thompson, Thornton, CO (US)

(73) Assignee: UChicago Argonne, LLC, Chicago, IL (US)

( * ) Notice: Subject to any disclaimer, the term of this patent is extended or adjusted under 35 U.S.C. 154(b) by 474 days.

(21) Appl. No.: 10/782,278

(22) Filed: Feb. 18, 2004

(65) Prior Publication Data

US 2007/0235702 A1    Oct. 11, 2007

Related U.S. Application Data

(60) Provisional application No. 60/448,792, filed on Feb. 18, 2003.

(51) Int. Cl.
| | |
|---|---|
| *G21F 9/16* | (2006.01) |
| *C01G 43/01* | (2006.01) |
| *C01G 56/00* | (2006.01) |
| *C01G 57/00* | (2006.01) |
| *C01F 5/26* | (2006.01) |

(52) U.S. Cl. ............................. 252/625; 423/2; 423/3; 423/250; 423/251; 423/253; 423/490; 588/10

(58) Field of Classification Search .............. 588/1–4, 588/9, 15, 19, 10; 252/625; 423/2–3, 250, 423/251, 253, 490
See application file for complete search history.

(56) References Cited

U.S. PATENT DOCUMENTS

| | | | | |
|---|---|---|---|---|
| 3,416,888 | A | * | 12/1968 | Notari .......................... 423/628 |
| 4,412,861 | A | * | 11/1983 | Kreuzmann ................... 75/399 |
| 5,645,518 | A | | 7/1997 | Wagh et al. |
| 5,830,815 | A | | 11/1998 | Wagh et al. |
| 6,133,498 | A | | 10/2000 | Singh et al. |
| 6,153,809 | A | | 11/2000 | Singh et al. |
| 6,204,214 | B1 | | 3/2001 | Singh et al. |
| 2002/0009622 | A1 | * | 1/2002 | Goodson ..................... 428/703 |

* cited by examiner

*Primary Examiner*—Wayne A. Langel
*Assistant Examiner*—James Fiorito
(74) *Attorney, Agent, or Firm*—Olson & Hierl, Ltd.; Harry M. Levy

(57) ABSTRACT

A method of stabilizing nuclear material is disclosed. Oxides or halides of actinides and/or transuranics (TRUs) and/or hydrocarbons and/or acids contaminated with actinides and/or TRUs are treated by adjusting the pH of the nuclear material to not less than about 5 and adding sufficient MgO to convert fluorides present to $MgF_2$; alumina is added in an amount sufficient to absorb substantially all hydrocarbon liquid present, after which a binder including MgO and $KH_2PO_4$ is added to the treated nuclear material to form a slurry. Additional MgO may be added. A crystalline radioactive material is also disclosed having a binder of the reaction product of calcined MgO and $KH_2PO_4$ and a radioactive material of the oxides and/or halides of actinides and/or transuranics (TRUs). Acids contaminated with actinides and/or TRUs, and/or actinides and/or TRUs with or without oils and/or greases may be encapsulated and stabilized by the binder.

27 Claims, 2 Drawing Sheets

__US 7,294,291 B2__

CERAMICRETE STABILIZATION OF U- AND PU-BEARING MATERIALS

RELATED APPLICATIONS

This application, pursuant to 37 C.F.R. 1.78(c), claims priority based on provisional application Ser. No. 60/448,792 filed on Feb. 18, 2003.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

This invention is directed toward improved compositions and methods relating to methods of stabilizing nuclear materials including weapons grade materials such as U or Pu fluorides, chlorinated oxides, so-called "non MOXables and mixed waste previously described and disclosed in the following U.S. patents, the disclosures of each of which are herein incorporated herein by reference, U.S. Pat. No. 5,645,518, Method for Stabilizing Low-Level Mixed Wastes at Room Temperature, Assigned to Univ. Chicago, Inventors: Arun S. Wagh and Dileep Singh (1997); U.S. Pat. No. 5,830,815, Method of Waste Stabilization via Chemically Bonded Phosphate Ceramics, Assigned to Univ. Chicago, Inventors: Arun S. Wagh, Dileep Singh, and Seung Young Jeong (1998); U.S. Pat. No. 6,153,809, Polymer Coating for Immobilizing Soluble Ions in a Phosphate Ceramic Product, assigned to US Department of Energy, Inventors: D. Singh, A. Wagh, and K. Patel (2001); U.S. Pat. No. 6,133,498, for Method for Producing Chemically Bonded Phosphate Ceramics and for Stabilizing Contaminants Encapsulated Therein Utilizing Reducing Agents From An Aqueous Solution, Assigned to US Department of Energy, Inventors: D. Singh, A. Wagh, and S. Jeong (2001); and U.S. Pat. No. 6,204,214, Pumpable Injectable Phosphate-Bonded Ceramics, Assigned to Univ. Chicago, Inventors: D. Singh, A. Wagh, L. Perry, and S. Jeong (1998).

In accordance with a treaty between Governments of United States and Russia, disposition of Pu and other actinides or transuranics (TRUs) must conform to the Spent Nuclear Fuel (SNF) standard to make it unattractive to proliferators. The SNF standard requires that Pu, U and possibly other actinides such as AM or TRUs be as difficult to recover from any form as it would be to recover from SNF. The current DOE-proposed method is for plutonium to be first stabilized and solidified in a solid matrix, then encapsulated in glass containing radioactive components such as fission products, and stored in facilities such as proposed at Yucca Mountain in the United States and a similar facility in Russia. Such disposition has come to be known as DOE's Immobilization Program for weapons-grade and non-weapons grade excess nuclear material. This invention relates to a method of stabilization and solidification—immobilization—of actinides and/or TRUs more safely and efficiently than the current DOE-proposed method, and the product produced thereby.

Facilities for processing actinides, especially plutonium, to meet the SNF are not available at this time. Therefore, to meet U.S. Nuclear Material Disposition requirements, certain Pu and Pu-bearing compounds must be stabilized and packaged to meet current shipping and long-term, i.e., up to 50 years, storage requirements. These requirements, targeted at eliminating hydrogenous components in the material, including moisture, are designed to minimize $H_2$ generation and associated pressure build-up over time in the shipping and storage containers. They are also designed to minimize the presence of moisture that may compromise the criticality potential of the materials and to minimize corrosives such as halogenated compounds that may compromise the integrity of the container. The DOE 3013 Standard specifies stabilization process and container technology for meeting these objectives. This invention addresses a method of stabilization and solidification, as well as the product, to meet the performance objectives—safe storage—of the 3013 Standard more safely and efficiently.

Nuclear materials in the US Department of Energy Complex in the United States, Former Soviet Union (FSU) countries, and other nuclear countries in the world exist in various forms. These may be as oxides, halides (such as fluorides, chlorides), chlorinated oxides, other salts, or in acids. Furthermore, there exist various organic chemicals contaminated by actinides and/or TRUs, such as oils, greases and solvents. There is a need for a stabilization technology that will treat this range of materials effectively to meet not only the immobilization and stabilization/safe storage standards cited above but also the Waste Isolation Pilot Plant Waste Acceptance Criteria (WIPP-WAC). This invention also provides a method for producing monoliths of actinides and/or TRU/mixed wastes (e.g., ash, slag, oxides, chloride, fluoride, organics, other salts, or acids) that would minimize $H_2$ and volatile organic compounds (VOC) generation, resist/reduce Pu recoverability to meet Safeguards Termination Limits (STL) performance objectives, and would not be dispersive. The invention, provides methods as well as the products, of producing ceramic monoliths at room temperatures or at slightly elevated temperatures where volatilization of components does not occur. Once formed and heated at low temperatures (to eliminate water), these ceramic monoliths could be safely shipped and stored without pressure build-up concerns, and could also be heat treated to high temperatures and encapsulated in molten glass without affecting their integrity or without concerns of off-gases.

Even for low-level and non-radioactive organic hazardous waste treatment applications, there is a need for a low-temperature stabilization technology. The conventional approach in disposal of contaminated oils, greases, and other organics is to destroy them by some pre-treatment method, e.g., pyrolysis, and then stabilize the ash resulting from the pyrolysis. The off-gas from this operation, however, may be contaminated by hazardous contaminants and hence this method is both costly and opposed by many communities.

Earlier Stabilization and Immobilization (S/I) technologies for S/I for TRU nuclear material or waste disposition include: heating to eliminate $H_2O$ and organics, then sealing in welded shipping and containers; ceramification, including SYNROC; cementation, including FUTAP cements; sorption in fly ash, including Gubka technology; or vitrification. While there are serious concerns of hydrogen generation with hydrated cements, ceramification and vitrification require high temperature treatment. If the waste streams contain volatile or corrosive compounds, e.g., containing latent moisture, fluorides, chlorides, or organics, their high temperature treatment poses off-gassing issues and also interferes with formation of a monolithic ceramic or glass. Cost of these processes and generation of secondary waste streams such as contaminated furnaces, etc., are major issues.

SUMMARY OF THE INVENTION

Accordingly, it is an important object of the present invention to provide a method for disposing of actinides and/or TRU's present in a wide variety of forms which produces stable monolithic ceramic material applicable to both radioactive and mixed materials and/or wastes with minimum hydrogen production.

Yet another object of the present invention is to provide a method of stabilizing nuclear material including one or more of the oxides and/or halides of actinides and/or transuranics (TRUs) and/or hydrocarbons and/or acids contaminated with actinides and/or TRUs, comprising treating the nuclear material by adjusting the pH of the liquid material or any portion thereof, if required, to be not less than about 5 and adding sufficient MgO to convert fluorides present to $MgF_2$ and adding γ alumina in an amount sufficient to absorb substantially all hydrocarbon liquid present, adding a binder including MgO and $KH_2PO_4$ to the treated liquid nuclear material to form a slurry, wherein the binder is present in an amount not less than about 20% by weight of the combination of nuclear material and binder, the MgO in the binder being present not less than 15% by weight of the combination nuclear material and binder, adding MgO in addition to the stoichiometric quantity necessary to react with the $KH_2PO_4$ in an amount up to about 45% by weight of the combined nuclear material and the binder depending on the make up of the nuclear material and the rate of reaction for the $MgKPO_4$ formed by reaction.

A further object of the present invention is to provide a method of stabilizing nuclear material including one or more of the oxides and/or halides of actinides and/or transuranics (TRUs) and/or hydrocarbons and/or acids contaminated with TRUs, comprising treating the nuclear material by adjusting the pH of the liquid nuclear material or any portion thereof to be not less than about 5 if required with calcined MgO and adding sufficient calcined MgO to convert fluorides present to $MgF_2$ and adding γ alumina in an amount sufficient to absorb substantially all hydrocarbon liquid present, adding a binder including calcined MgO and $KH_2PO_4$ to the treated liquid nuclear material to form a slurry, wherein the binder is present in the range of from about 60% to about 80% by weight of the combination of nuclear material and binder, the calcined MgO in the binder being present not less than 15% by weight of the combination nuclear material and binder, adding a borate or boric acid to control the rate of reaction and calcined MgO in addition to the stoichiometric quantity necessary to react with the $KH_2PO_4$ in an amount up to about 45% by weight of the combined nuclear material and the binder depending on the make up of the nuclear material and the rate of reaction for the $MgKPO_4$ formed by reaction.

A final object of the invention is to provide a crystalline radioactive nuclear material form, comprising a binder of the reaction product of calcined MgO and $KH_2PO_4$, and a radioactive material of the oxides and/or halides of actinides and/or transuranics (TRUs) and/or acids contaminated with actinides and/or TRUs, and/or actinides and/or TRUs with or without hydrocarbons, such as solvents, oils and/or greases treated prior to mixing with the binder to have a pH not less than about 5 and to convert fluorides present to $MgF_2$ with calcined MgO and to absorb liquid hydrocarbons present with γ alumina, wherein the radioactive material is encapsulated and stabilized by the binder, the binder being present in an amount not less than 20% by weight of the crystalline radioactive material form.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
FIG. 1 is a scanning electron photomicrograph of a fractured surface of a $ZrF_4$ form.

Although the following description refers to actinides and transuranics (TRU's), it is intended to incorporate the various fission products which may be present in any high level radioactive waste material. Moreover, the use of the term "mixed waste material" is intended to cover both radioactive and hazardous materials, the latter of which may be represented by mercury and other well known poisonous and hazardous materials. Also used herein in the general sense is the term "organics" and this is intended to cover oils, greases, liquid and solid hydrocarbons, as well as solvents. Acids contaminated with actinides or TRU's are also to be taken in their most general form and the acids may either be inorganic or organic. In addition, the invention includes the treatment of chlorinated oxides unsuitable for the Mixed Oxide Fuel (MOX) process. The presence of chlorine and other contaminants prevents some high level nuclear material from being converted to oxide fuels, and contaminated materials negative treatment when the presently available thermal technology for processing and packaging these materials is inapplicable to these materials.

Ceramicrete® binder, a registered trademark of the University of Chicago, has been investigated and used for stabilization of hazardous and low-level radioactive waste as disclosed in the incorporated patents. It is a room-temperature process in which magnesium oxide (MgO), preferably calcined, is reacted with a solution of monopotassium phosphate ($KH_2PO_4$) to form a dense ceramic. Actinides and/or TRU radionuclides may be encapsulated in this ceramic, and fillers may be added to provide additional stability. This invention provides stabilization and solidification of actinides including plutonium oxides containing chlorides, plutonium fluorides, oils, greases, hydrocarbons, including solvents and acids contaminated by actinides and/or TRUs. The end product in these materials is a phosphate-bonded waste form of radioactive material encapsulated in magnesium potassium phosphate hexahydrate (MKP, $MgKPO_4.6H_2O$). For actinide or TRU/mixed wastes, minimal $H_2$ generation, plus low recoverability to meet STL are important aspects of the invention.

To make the waste forms very stable, a filler such as alumina (corundum) which is very stable up to 1800° C. may be used. Alternatives to alumina are zirconia, titania, or any tetravalent metal oxides.

Very high loading of actinides or TRU oxides may be achieved in this ceramification. This may be as high as 80 wt. % without loss of integrity of the product, but generally loading in the range of from about 40% to about 80% by weight of the entire monolithic ceramic and waste is obtained.

To encapsulate fluorides, excess MgO is used to convert the fluoride solutions into $MgF_2$, which then becomes encapsulated in the magnesium potassium phosphate hexahydrate and becomes non-leachable.

To encapsulate liquid, semi-liquid and solid hydrocarbons such as solvents, greases, and oils, we have discovered identified a catalyst alpha alumina (γ-alumina) which absorbs hydrocarbon-containing liquids and gets encapsulated in the ceramic. Semi-liquid and solid organics do not get absorbed by γ alumina, but do become encapsulated in the monolithic $MgKPO_4$.

To encapsulate acids, MgO, preferably calcined, is added to neutralize the acid and adjust the pH to >5 and $KH_2PO_4$ is added and stirred. Contaminants are encapsulated in the magnesium potassium phosphate hexhydrate and become non-leachable.

The basic Ceramicrete® binder consists of calcined magnesium oxide and monopotassium phosphate which when mixed with water forms a slurry that sets into a hard ceramic. The reaction is represented by $$MgO + KH_2PO_4 + 5H_2O \longrightarrow MgKPO_4 \cdot 6H_2O$$

The reaction product is the ceramic in which various second-phase materials may be added for higher strength and reduced porosity. The reaction is an acid-base reaction in which waste streams, both acidic and alkaline, can be added and stabilized in a solid form.

The following examples demonstrate the effectiveness of the chemically bonded phosphate ceramic technology in stabilizing the materials and waste streams described above.

EXAMPLE 1

Normally, Ce is considered to be a surrogate of Pu or U; thus, the surrogate of $UF_4$ will be $CeF_4$. In practice, however, $CeF_4$ is a very insoluble compound and will therefore not leach out in the leaching tests. The forms need to be tested in a worst-case scenario in which if the encapsulation is not perfect, it can be detected through the leaching of the surrogate of the contaminant. For this reason, $ZrF_4$ was used as the surrogate of $PuF_4$, because $ZrF_4$ is soluble and hence can be immediately detected in the leaching tests.

$ZrF_4$ was added to the mixture of MgO and $KH_2PO_4$ at a loading of 10 wt. %. This translates into actual loading of $PuF_4$ at a loading of 17.5 wt. %, which far exceeds the STL criterion. The STL objective is to make the material less attractive by making useful amounts of TRU's harder to recover. The specific criteria for achieving STL may become less important as security is increased at WIPP to control access to the waste materials there. Samples were cured for at least one month. Samples cured for shorter time and removed from the molds develop some white precipitate on the surface of the samples within days. The use of deionized water also helps to avoid this precipitation. Purity of the binders is also very important in this stabilization of fluorides. These requirements do not exist in stabilization of other materials and hence is an additional requirement in stabilizing fluorides. The longer curing time will not be a problem because an equilibration period of at least 142 days is required prior to head-space gas sampling.

The density of the samples was 1.73 g/cc, which indicates that it is a lightweight material.

Figure 2:
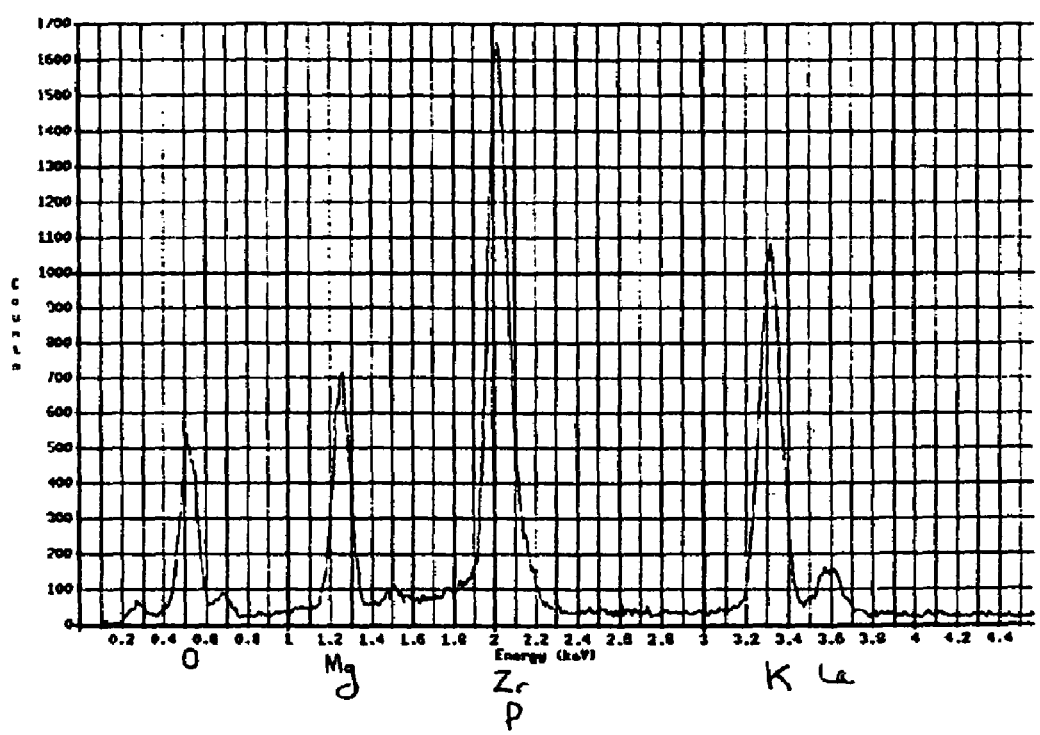
FIG. 2 is an EDX plot of the form of FIG. 1 in cpm vs. energy (keV) for oxygen, magnesium, zirconium, potassium phosphorous and calcium.

FIGS. 1 and 2 show the microstructure, along with its energy-dispersive X-ray (EDX) output. In general, there is a dense structure with packing of granules. No porosity is visible, implying that the form is very dense.

The EDX (FIG. 2) results for various areas show peaks of Zr and P (their peaks overlap), Mg, and K, which are the ingredients of the form. There was virtually no variation of the intensity of peaks in different areas, implying that phase distribution was very homogeneous or that all components are well mixed in the form. Due to the very fine particle size, it was not possible to focus the beam on individual particles and obtain mapping of individual components. Considerable back-scattering occurred. Boron additives have been used to slow the stabilization reaction, but in this case also provides neutron absorption in stabilized waste forms. Both boric acid and sodium borate are acceptable.

One of the samples was immersed in deionized water and the ANS 16.1 90-day immersion test was conducted to detect leaching of F and Zr. Satisfactory results are obtained.

EXAMPLE 2

To simulate Rocky Flats Energy Technology site (RFETS) Item Description Codes (IDCs) 060, Plutonium Oxide, and 067, Chlorinated Oxide, the composition given in Table 1 was used as the surrogate, based on the composition of the residue as Pu=67.87 wt. %, NaCl/KCl=17 wt. %, W=0.5-5 wt. %, and Am, Fe, Ni as traces. Because the molar weight of $CeO_2$ is only 0.6 times that of $PuO_2$, the surrogate composition was altered so that there was the same molar percentage of the simulated actinide in the surrogate. Such a formulation has two advantages: it correctly represents the molar concentration of the actinide and it provides a much higher percentage of the salts in the composition, thus simulating the worst-case scenario for salt stabilization. The implication is that if this material is stabilized with its very high salt content, then stabilizing the real material with its lower salt content should be easier.

TABLE 1

Composition of chlorinated oxide surrogate

| Components | Weight. % |
|---|---|
| CeO2 as surrogate of Pu and U | 30 |
| NaCl | 31.34 |
| KCl | 31.34 |
| W | 5 |
| Fe$_2$O$_3$ | 1 |
| NiO | 0.23 |
| Al$_2$O$_3$ | 1.09 |

The material loading is defined as the weight percent of material to be stabilized within the total blend of binder powders and material. In each case, exploratory tests were conducted to determine optimal waste loading that can be achieved while still obtaining a good ceramic that is macroscopically homogeneous and hard. The loading was varied from 10 wt. % to as much as 60 wt. % and samples were made, then poured in molds after the blend of powders was mixed in water for 25 minutes. Those samples that set in one day were considered to be setting compositions. For any particular loading, if any gas bubbles were generated due to decomposition of the waste stream, that composition was discarded as unfit for material stabilization.

In these tests, it was found that 53 wt. % of the chlorinated oxide loading was easily possible. A sample made with 40 wt. % oxide material was subjected to leaching overnight in tap water. The initial pH was 8.03 and the final was 8.8. There was a 6.6 wt. % weight loss. This loss may be attributed to leaching of MgO because of the high pH of the water. This leaching of MgO is normal after one day of the setting of the ceramic. This leaching can be arrested much better if the samples are cured for a long period of time. An important observation, however in this test, is that the leaching level was much less even though >60 wt. % chlorides was in the loaded material.

EXAMPLE 3

To simulate contaminated acid, i.e., HCl, concentrated HCl was used as the surrogate and conducted the tests.

During stabilization of concentrated HCl, the HCl effectively reacts with MgO from the binder and forms $MgCl_2$ that is then encapsulated in the Ceramicrete matrix. The reaction may be represented by

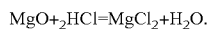
$$MgO + 2HCl = MgCl_2 + H_2O.$$

This equation implies that two moles of HCl will produce one mole of $H_2O$. Because of this additional water produced during the reaction, the amount of water required to be combined with in the Ceramicrete® binder to form a slurry was reduced, and because some MgO is consumed in binding HCl this way, proportionately more MgO was added to the entire blend. The composition is given in Table 2.

Boric acid was added to retard the reaction so that practical ceramics could be made. Without boric acid, the reaction is too fast and is highly exothermic. By adding boric acid, the reaction was slowed to allow a mixing and pouring time of 10 minutes.

TABLE 2

Composition of the forms for HCl immobilization

| Component | Composition (wt. %) |
|---|---|
| Concentrated HCl | 30 |
| MgO | 22.7 |
| Class F fly ash | 3 |
| $KH_2PO$ | 17.3 |
| Boric acid | 2.2 |
| $H_2O$ | 3.9 |

If the reaction must be slowed further, additional MgO was mixed with HCl, slowly at first, until the solution was neutralized and that solution was used to form ceramics by combining it with the rest of the binder components. This way, large-scale stabilization of acids can be achieved. Up to about 45% by weight of MgO may be used over and above the amount required for the reaction with $KHPO_4$ without adversely affecting the resulting monolithic ceramic.

In this Example, 110.4 g of calcined MgO was added to a Hobart mixer at slow speed. MgO was gradually added to ensure that the solution did not heat too much at a given time. It took 40 minutes to add all of the MgO. At the end the pH of the solution was 6. At this point an additional 37.5 g of calcined MgO was added along with 150 g of Class F ash and 112.5 g of KH2P. To slow down the reaction, boric acid was added at a loading of 2 wt. % of the total powders, i.e., equal to 14.2 g. The entire slurry was then mixed with 25.7 g of water. With continued mixing, the slurry warmed up. It was poured in molds. It set within 10 minutes after adding the water.

Samples made with the composition given in Table 1 had a density of 1.68 g/cc.

EXAMPLE 4

Another test similar to Example III had an aqueous solution Pu and U concentrations of 4.45 g/L and <0.02 g/L. The initial pH was very low indicating it was an acidic solution. 30 ml of this solution was mixed with approximately 10 g of MgO to raise the pH to >5. To this mixture 40 g of the conventional mixture of Ceramicrete® 2 (1 part MgO and 3 parts of $KH_2PO_4$) was added. The mixture set in 45 minutes into a hard mass.

These Examples show that the subject inventive process produces monolithic ceramic structures from contaminated acid solutions.

EXAMPLE 5

Contaminated oils at RFETS range from light machining oils to pump oils. To simulate contaminated oil, mineral oil was used as the surrogate because it is considered more representative of the more difficult oils to be stabilized. γ-alumina is a catalyst that absorbs oils and can be used to pretreat the contaminated oils and greases. Experiments showed that as much as 35 grams of mineral oil in 100 grams can be absorbed in γ-alumina.

In one experiment 25 grams of mineral oil was absorbed in 75 grams of γ alumina which formed clumps of γ alumina. To this was added 100 grams of the Ceramicrete® binder and 50 grams of water. It was poured in syringes used as molds. After several hours, the mixture set into a solid.

The density of the solid was found to be 1.66 g/cc.

In another example, 30 ml of pump oil was mixed with 70 g of alumina. The result was a dry clumpy powder. This was mixed with 100 grams of a mixture of 50% Class F ash and the rest Ceramicrete® binder. Then 25 ml of water was added and the slurry was mixed thoroughly. It set in 90 minutes.

EXAMPLE 6

The use of γ-alumina was extended to absorb liquids that are not compatible with the inorganic Ceramicrete® binder and thereafter microencapsulated this γ alumina in the Ceramicrete® binder to form the monolithic ceramic. The test was conducted on actual waste from RFETS coded as X17222.

This waste contained 0.00205 g of Pu and 0.08 g of Upper liter of the solution. Stabilization was exactly as in Example 5, except that the amount of water added now was 35 g, but other loadings were the same. The samples had set in 90 minutes.

EXAMPLE 7

Often many of the waste streams at several DOE sites are treated with commercial stabilizers such as conventional Portland cement, Acid Bond, Petro Bond etc. If, for whatever reason, the test fails, more waste is created than the original amount. In such cases, a stabilizer is required that can treat these failed residues.

In one example, the X17222 organic liquid was mixed with Portland cement to create the failed residue. 40 ml of the waste was mixed with 80 ml of cement to form a clumpy mixture. This mixture represented the failed residue, which was mixed with 170 g of Ceramicrete® binder with 50 wt. % ash in it and 70 ml of water. Boric acid at 0.4 wt. % of the total powder mixture was added to slow down the reaction. The thick liquid formed this way set into a hard ceramic overnight.

EXAMPLE 8

Pump oil was substituted in Example 7 instead of the organic liquid. All proportions were the same. Again it set overnight.

EXAMPLE 9

100 g of Petro Bond and 400 g ml of X17222 organic liquid were mixed. The mixture formed a fluffy yellow granular substance. 25 ml of this was mixed with 50 g of Ceramicrete® binder, 0.25 wt. % boric acid and 17 g of $H_2O$. The mixture set well overnight.

EXAMPLE 10

100 g of Petro Bond was mixed with 400 g of X14627 oil. The mixture was like soft wet sawdust. 25 ml of this mixture was mixed with 50 g of Ceramicrete® binder, 2.5 g of boric acid and 27 g of water. The mixture set overnight.

EXAMPLE 11

40 ml of Acid Bond-treated aqueous waste (from which solution was diffusing) was mixed with 60 g of Ceramicrete® binder and fly ash (50% of each) and 5 ml of $H_2O$. The mixture set overnight to a granular material.

In these Examples, various weapons-grade or waste-level radioactive actinides and/or TRU's nuclear materials, both solids, liquids, as well as liquid with some solids, containing acids and/or organics were converted to monolithic ceramics capable of storage and accomplishing all the objects of the invention.

Although boron as acid or borates has been added to Ceramicrete® binder to control the rate of reaction, usually at 2% or lower, larger loadings of boron are particularly useful in the treatment of wastes containing radioactive materials such as, but not limited to $PuF_4$, so that the crystalline material formed is self shielding. Calculations of how much boron material is required is dependent upon the nature of the waste and is within the skill of the art to calculate.

While particular embodiments of the present invention have been shown and described, it will be appreciated by those skilled in the art that changes, modifications and improvements may be made without departing from the true spirit and scope of the invention.

The embodiments of the invention in which an exclusive property or privilege is claimed are defined as follows:

1. A method of stabilizing nuclear material including one or more members selected from the group consisting of: (a) the oxides or halides of actinides and/or transuranics (TRUs), (b) hydrocarbons contaminated with actinides and/or TRUs and (c) acids contaminated with actinide and/or TRUs wherein fluorides and/or hydrocarbons are present in the nuclear material, comprising treating the nuclear material by adjusting the pH of the nuclear material or any portion thereof to be not less than about 5 if required and adding sufficient MgO to convert fluorides present to $MgF_2$ and adding γ alumina in an amount sufficient to absorb substantially all hydrocarbon liquid present, adding a binder including MgO and $KH_2PO_4$ to the treated nuclear material to form a slurry, wherein the binder is present in an amount not less than about 20% by weight of the combination of nuclear material and binder, the MgO in the binder being present not less than 15% by weight of the combination nuclear material and binder, adding MgO in addition to the stoichiometric quantity necessary to react with the $KH_2PO_4$ in an amount up to about 45% by weight of the combined nuclear material and the binder depending on the make up of the nuclear material and the rate of reaction for the $MgKPO_4$ formed by reaction.

2. The method of claim 1, wherein the actinides and/or TRUs contain uranium values.

3. The method of claim 1, wherein the actinides and/or TRUs contain plutonium values.

4. The method of claim 1, wherein the halides contain fluorides.

5. The method of claim 1, wherein the hydrocarbons contain oils and/or greases.

6. The method of claim 1, wherein the nuclear material is a waste material.

7. The method of claim 1, wherein the pH is adjusted prior to other treatment of the nuclear material.

8. The method of claim 1, wherein a borate and/or boric acid is added during stabilization to control the rate of reaction.

9. The method of claim 1, wherein a filler is added during stabilization.

10. The method of claim 9, wherein the filler is a tetravalent metal oxide and/or alumina and/or class F fly ash.

11. The method of claim 10, wherein the tetravalent metal oxide is one or more of titania or zirconia.

12. The method of claim 1, wherein the pH is adjusted with MgO.

13. The method of claim 1, wherein the MgO is calcined.

14. The method of claim 1, wherein the liquid nuclear material has previously been treated with a stabilizer without a mixture of MgO and $KH_2PO_4$.

15. A method of stabilizing nuclear material including one or more members selected from the group consisting of: (a) the oxides or halides of actinides and/or transuranics (TRUs), (b) hydrocarbons contaminated with actinides and/or TRUs, and (c) acids contaminated with actinide and/or TRUs wherein fluorides and/or hydrocarbons are present in the nuclear material, comprising treating the nuclear material by adjusting the pH of the liquid nuclear material or any portion thereof to be not less than about 5 with calcined MgO if required and adding sufficient calcined MgO to convert fluorides present to $MgF_2$ and adding alumina in an amount sufficient to absorb substantially all hydrocarbon liquid present, adding a binder including calcined MgO and $KH_2PO_4$ to the treated liquid nuclear material to form a slurry, wherein the binder is present in the range of from about 60% to about 80% by weight of the combination of nuclear material and binder, the calcined MgO in the binder being present not less than 15% by weight of the combination nuclear material and binder, adding a borate or boric acid to control the rate of reaction and calcined MgO in addition to the stoichiometric quantity necessary to react with the $KH_2PO_4$ in an amount up to about 45% by weight of the combined nuclear material and the binder depending on the make up of the nuclear material and the rate of reaction for the $MgKPO_4$ formed by reaction.

16. The method of claim 15, wherein the actinides and/or TRUs contain uranium and/or plutonium values.

17. The method of claim 15, wherein the halides contain chlorides and/or fluorides.

18. The method of claim 15, wherein the hydrocarbon liquid contains greases and/or oils.

19. The method of claim 15, and further comprising adding a filler of alumina and/or a tetravalent metal oxide and/or class F fly ash.

20. A crystalline radioactive material comprising a binder of the reaction product of calcined MgO and $KH_2PO_4$, and a radioactive material of the oxides and/or halides of actinides and/or transuranics (TRUs) and/or acids contaminated with actinides and/or TRUs, and/or actinides and/or TRUs with or without oils and/or greases treated prior to mixing with said binder to have a pH not less than about 5 and to convert fluorides present to $MgF_2$ with calcined MgO and to absorb liquid hydrocarbons present with alumina, wherein said radioactive material is encapsulated and stabilized by said binder, said binder being present in an amount not less than 20% by weight of the crystalline radioactive material wherein said crystalline radioactive material contains either or both of $MgF_2$ or alumina with hydrocarbons absorbed thereby.

21. The crystalline radioactive material of claim 20, wherein said binder is present in the range of from about 60% to about 80% by weight thereof.

22. The crystalline radioactive material of claim 21, wherein said actinides and/or TRUs contain uranium and/or plutonium values.

23. The crystalline radioactive material of claim 22, wherein the pH is adjusted with calcined MgO.

24. The crystalline radioactive material of claim 23, wherein the pH is not less than about 6.

25. The crystalline radioactive material of claim 20, and further including up to about 2% by weight of the reaction products of a borate and/or boric acid and said binder.

26. The crystalline radioactive material of claim 20, and further including a filler of one or more of alumina and/or a tetravalent metal oxide and/or class F fly ash.

27. The crystalline radioactive material of claim 20, wherein the radioactive material contains chlorinated material mixed with actinide oxides.

* * * * *

UNITED STATES PATENT AND TRADEMARK OFFICE
CERTIFICATE OF CORRECTION

PATENT NO. : 7,294,291 B2 Page 1 of 1
APPLICATION NO. : 10/782278
DATED : November 13, 2007
INVENTOR(S) : Arun S. Wagh, David Maloney and Gary H. Thompson It is certified that error appears in the above-identified patent and that said Letters Patent is hereby corrected as shown below:

On Title Page
Item 57 in the Abstract, line 5, before the word "alumina" insert the following symbol --δ--.

Col. 9, Claim 1, line 60, before the word "alumina", the symbol "γ" was marked for deletion in Amendment B and should be deleted.

Col. 9, Claim 1, line 60, before the word "alumina" insert the symbol --δ--.

Signed and Sealed this

Twentieth Day of May, 2008

JON W. DUDAS
*Director of the United States Patent and Trademark Office*